(12) United States Patent
Joynt

(10) Patent No.: US 7,730,822 B2
(45) Date of Patent: Jun. 8, 2010

(54) PROTECTION AGAINST LANDMINE EXPLOSION

(75) Inventor: Vernon P. Joynt, Pretoria (ZA)

(73) Assignee: CSIR, Pretoria (ZA)

( * ) Notice: Subject to any disclaimer, the term of this patent is extended or adjusted under 35 U.S.C. 154(b) by 967 days.

(21) Appl. No.: 10/557,857

(22) PCT Filed: May 26, 2004

(86) PCT No.: PCT/IB2004/001717

§ 371 (c)(1),
(2), (4) Date: Aug. 15, 2006

(87) PCT Pub. No.: WO2004/106840

PCT Pub. Date: Dec. 9, 2004

(65) Prior Publication Data

US 2006/0272491 A1   Dec. 7, 2006

(30) Foreign Application Priority Data

May 27, 2003 (ZA) .................................. 2003/4107
Aug. 11, 2003 (ZA) .................................. 2003/6211

(51) Int. Cl.
*F41H 7/02* (2006.01)
(52) U.S. Cl. .................................................. 89/36.08
(58) Field of Classification Search ................ 89/36.07, 89/36.08, 36.09, 36.11, 36.12
See application file for complete search history.

(56) References Cited

U.S. PATENT DOCUMENTS

| | | | | |
|---|---|---|---|---|
| 4,398,446 A | * | 8/1983 | Pagano et al. .............. | 89/36.08 |
| 4,404,889 A | * | 9/1983 | Miguel ....................... | 89/36.02 |
| 4,964,329 A | * | 10/1990 | Moxon et al. ................. | 86/50 |
| 5,442,990 A | | 8/1995 | Krohn | |
| 5,533,781 A | * | 7/1996 | Williams ..................... | 296/204 |
| 5,905,225 A | * | 5/1999 | Joynt ......................... | 89/36.02 |
| 6,619,177 B1 | * | 9/2003 | Hansen et al. ............... | 89/1.13 |
| 2004/0000227 A1 | * | 1/2004 | Einstein ...................... | 89/1.13 |

FOREIGN PATENT DOCUMENTS

| | | |
|---|---|---|
| JP | 2002090095 | 3/2002 |
| JP | 2002340499 | 11/2002 |

\* cited by examiner

*Primary Examiner*—Troy Chambers
(74) *Attorney, Agent, or Firm*—Sutherland Asbill & Brennan LLP

(57) ABSTRACT

A body and any occupant of a land vehicle (10) is protected against effects of a landmine explosion, by conducting shock waves laterally outwardly by means of one or more shock wave guide members (16, 18) of a material having high acoustic velocity, and located proximate a ground engaging element (12) of the vehicle. The material may be glass, ceramic or the like having an acoustic velocity of about 6000 m/sec or more, i.e. higher than other materials of other components of the land vehicle. Shock waves encounter less resistance in high-acoustic velocity materials and are thus conducted laterally outwardly, i.e. away from the body. The shock wave guide members may be located immediately above bottom runs of tracks (12) and annularly within wells of bogey wheels (14) of track vehicles; and annularly around hubs or within tyres of wheels of wheeled vehicles.

20 Claims, 3 Drawing Sheets

PROTECTION AGAINST LANDMINE EXPLOSION

TECHNICAL FIELD

This invention relates to a method of protecting a body or hull and any occupant of a land vehicle, such as an armoured vehicle, e.g. an armoured tank or car, against the effects of a landmine explosion, e.g. an anti-tank landmine explosion. It relates also to a land vehicle, and to a combination of a ground engaging element for a land vehicle and a shock wave guide member.

BACKGROUND OF THE INVENTION

When a vehicle sets off a landmine, generally the landmine explodes underneath a ground engaging element such as a wheel or track of the vehicle because of the ground pressure created by said ground engaging element on the landmine.

Japanese patent document having publication number 2002090095, discloses an apparatus for removing a mine buried under the ground surface. The apparatus includes a composite rotor having a plurality of generally coaxial rollers loosely located with lost motion in a radial direction over a fixed axis shaft mounted on, so as spatially to lead, a vehicle. The rollers can individually follow contours, hollows, humps, etc. to trigger landmines. Behind the rotor there is provided a protective plate screening the landmine blast and protecting the vehicle and an occupant.

Japanese Patent document having a publication number 2002340499, discloses a rotor including a plurality of blades. The rotor is rotated to cause the blades to cut into a ground surface to destroy mines. A curved safety cover is provided over the rotor to protect the vehicle and a driver from sand, mud and landmine fragments. A lower level grader-like blade deflects sand, mud and mine fragments laterally to provide a smooth running surface for the vehicle. It is notable that the vehicle is not intended to trigger landmines to explode, but to destroy landmines before explosion. The inventor thus did not anticipate landmine explosions and resulting shock waves.

U.S. Pat. No. 5,442,990 discloses a scarifying drum leading a track vehicle to explode landmines. A flap is provided over the drum to act as a shield.

SUMMARY OF THE INVENTION

In accordance with a first aspect of the invention, there is provided a method of protecting a body or hull and any occupant of a land vehicle movable along a substrate on ground engaging elements against the effects of a landmine explosion, including conducting shock waves generated by the landmine explosion laterally outwardly by means of a shock wave guide member of a material having a relatively high acoustic speed and located proximate a ground engaging element of the vehicle.

For purposes of this specification, terms denoting direction, such as fore, rear, lateral, and the like should be interpreted with reference to a normal direction of forward travel of a land vehicle. The term "laterally outward" means "sideways away from (the land vehicle)".

By "relatively high" acoustic speed is meant an acoustic speed higher than the acoustic speed of the metal used in components of the land vehicle. Such metal, e.g. steel, aluminum, and alloys thereof, generally have an acoustic speed of about 5000 m/sec.

The material of each shock wave guide member may be selected from materials including glass, a suitable ceramic such as an alumina, or the like, which have an acoustic speed of higher than about 6000 m/sec. Some ceramics may have acoustic speeds up to about 8000 m/sec.

When the vehicle is a track vehicle, the ground engaging elements being in the form of tracks, the guide member may be located in at least one of a well of a bogey wheel, i.e. an annular cavity surrounding a hub and radially inward of a rim of the bogey wheel; and immediately above a bottom run of a track intermediate bogey wheels.

When the vehicle is a wheeled vehicle, the ground engaging elements being in the form of wheels, the guide member may be located in a well of at least one of the wheels. The method may include absorbing energy by means of a liquid provided in a tyre of the vehicle, in the case that the wheels have tyres.

In accordance with a second aspect of the invention, there is provided a land vehicle movable along a substrate on ground engaging elements, which land vehicle is adapted or converted to protect its body or hull and any occupant against the effects of a landmine explosion, the land vehicle comprising a plurality of shock wave guide members proximate ground engaging elements thereof, the shock wave guide members being oriented to conduct shock waves laterally outwardly away from the body or hull.

When the land vehicle is in the form of a track vehicle, the ground engaging elements being in the form of tracks, the guide members may be positioned in wells of bogey wheels, as well as immediately above a bottom run of each track intermediate bogey wheels. Those guide members proximate tracks intermediate bogey wheels may have layers of low friction material, such as TEFLON, on their surfaces interfacing with the tracks.

When the land vehicle is in the form of a wheeled vehicle, the ground engaging elements being in the form of wheels, the guide members may be positioned annularly in wells of at least some of the wheels e.g. at least fore wheels. When the wheels have hollow tyres around wheel rims, the guide members may be positioned annularly in the hollows of the tyres. By way of development, cavities within the tyres may be filled with a liquid for absorbing some of the energy of the explosion. The liquid may be selected to have an appropriate boiling point and coefficient of latent heat of evaporation. It may, for example, be water, glycerin, a mixture of water and glycerin, or the like.

The guide members may be of composite construction, each guide member comprising a plurality of oriented or directed laminates of a material having an acoustic speed of at least about 6000 m/sec. Such material may be a primary material, e.g. a glass or ceramic material. The guide member may be in laminated form comprising laminates of the primary material interposed by an interface material having an acoustic speed lower than that of steel, the laminates being directed generally in said laterally outward and upward, oblique direction. The interface material may be a synthetic polymeric material. Said interface material may have an acoustic speed lower than that of air. The laminates may thus be sandwiched in-between layers of material having a relatively low acoustic speed, lower than about 1000 m/sec, even lower than the acoustic speed of air.

The laminates may be oriented to extend obliquely laterally outwardly in use.

A respective guide member may be positioned annularly inward of a tread of the wheel. It may be annularly around a hub of the wheel. It is preferably acoustically well coupled to a wheel frame (colloquially referred to as a wheel rim).

The guide members may have surfaces which are profiled snugly to be received with little clearance, or even slight touching, on surfaces of the ground engaging elements.

In accordance with a third aspect of the invention, there is provided the combination of a ground engaging element for a land vehicle and a shock wave guide member of a material having an acoustic speed of higher than about 6000 m/sec, the guide member being locatable proximate a ground engaging surface of the ground engaging element.

When the ground engaging element is a track and bogey wheel arrangement for a track vehicle, the guide member may be adapted for location in one of a well of a bogey wheel, and immediately above a lower run of the track intermediate bogey wheels.

When the ground engaging element is a wheel for a wheeled vehicle, the guide member may be adapted for location within a well of the wheel.

When the ground engaging element is a wheel, having a hollow tyre, for a wheeled vehicle, the guide member may be adapted for location within the hollow of the tyre.

These and other features of the present application will become apparent to one of ordinary skill in the art upon review of the following detailed description when taken in conjunction with the drawings and the appended claims.

BRIEF DESCRIPTION OF THE DRAWINGS

The invention is now described by way of examples with reference to the accompanying diagrammatic drawings. In the drawings

DETAILED DESCRIPTION OF THE INVENTION

Figure 1:
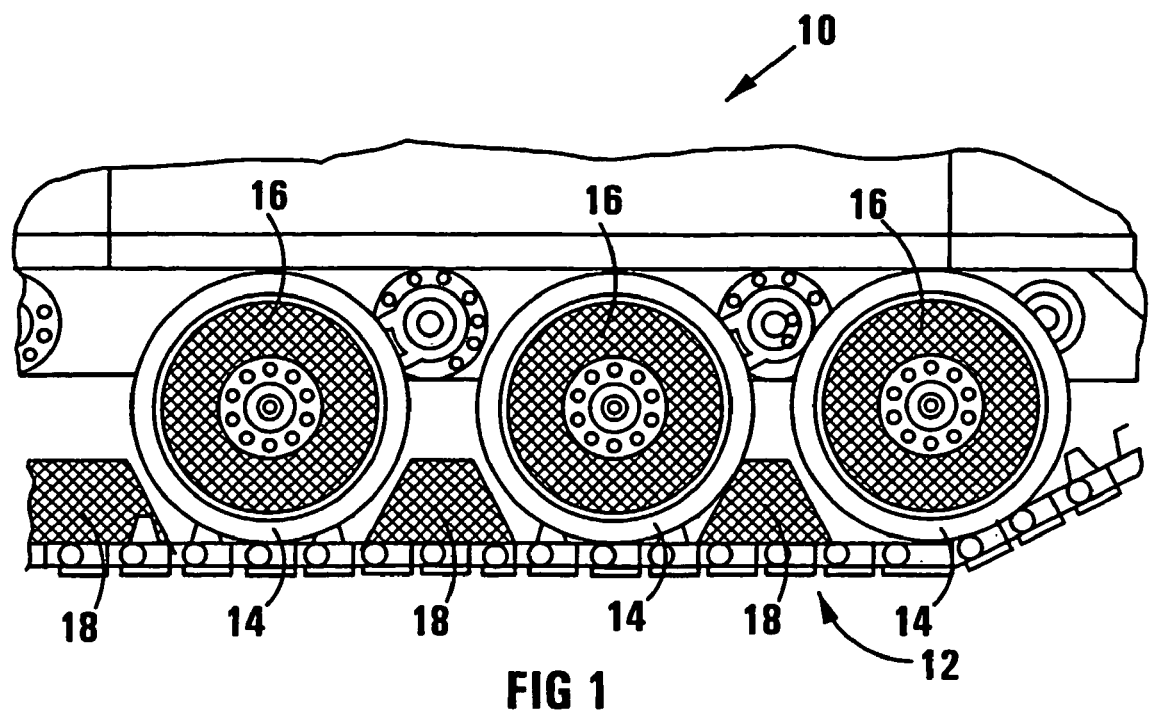
FIG. 1 shows, in fragmentary side view, a track vehicle converted in accordance with the invention.

With reference to FIGS. 1 to 4 of the drawings, a track vehicle in the form of an armoured tank is generally indicated by reference numeral 10. The track vehicle 10 has a pair of tracks 12 guided along a lower run of each track on bogey wheels 14. The track is shown fragmentarily only, and only one track 12 is shown, also fragmentarily.

In accordance with the invention, a first kind of guide member, generally indicated by reference numeral 16, is located within wells of the bogey wheels 14, i.e. annularly intermediate hubs 14.1 and rims 14.2 of the respective bogey wheels 14.

Figure 2:
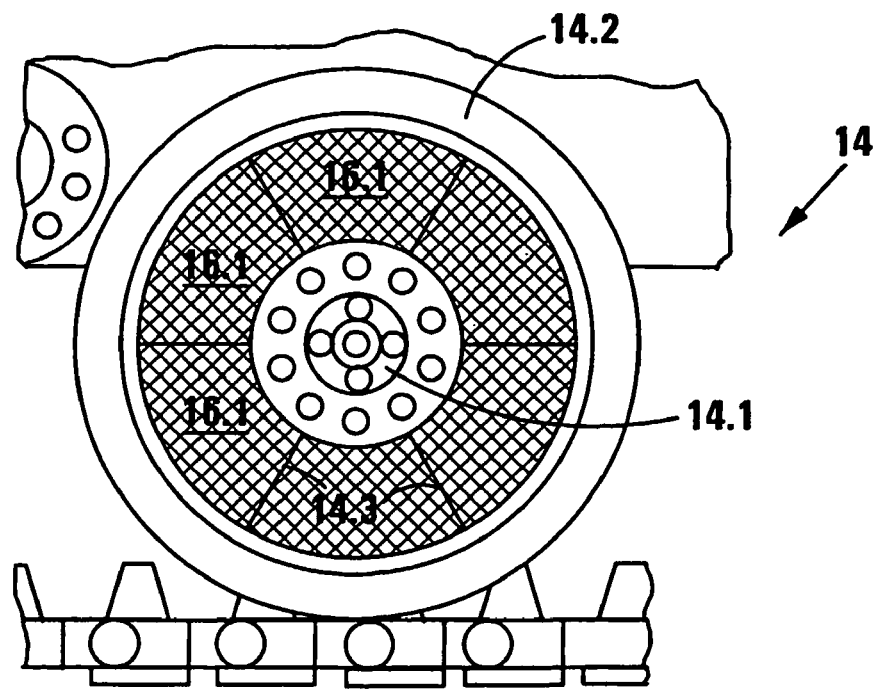
FIG. 2 shows, to a larger scale, fragmentarily, a bogey wheel of the track vehicle of FIG. 1, converted in accordance with the invention.

In the event that the bogey wheel 14 has webs 14.3 at circumferentially spaced positions within said wells, the guide member 16 is in the form of a composite guide member comprising a plurality of segments 16.1 shown in FIG. 2.

Figure 3:
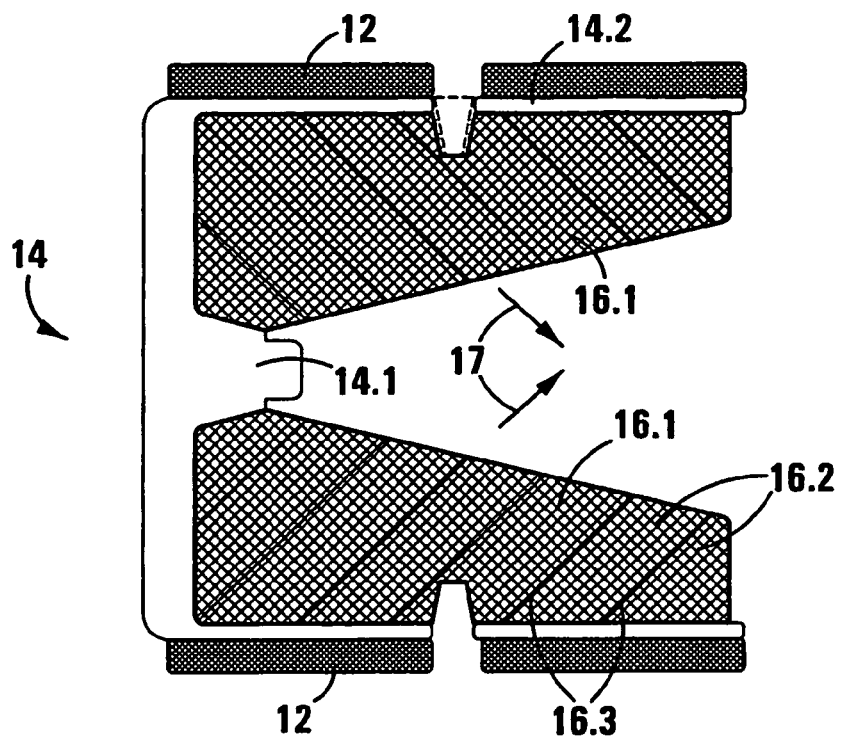
FIG. 3 shows, in diametrical section, the bogey wheel of FIG. 2.

As can best be seen in FIG. 3, each segment has a plurality of laminates 16.2 sandwiched in-between dividing layers 16.3 which may be of a yielding, even resilient, low acoustic speed material such as polyurethane, rubber or the like. The laminates 16.2 are oriented laterally outwardly.

In the event of a landmine explosion underneath the bogey wheel 14, shock waves generated by the landmine explosion will propagate through the track 12, through the rim 14.2 of the bogey wheel 14 immediately above the track 12 and will be "loaded into" the respective segment or segments 16.1. The Applicant has realized that shock waves encounter resistance to propagation inversely proportional to the acoustic speed of a material. Thus, in a material having a high acoustic speed like glass, especially ceramics, such as that of the guide member 16, the shock waves are guided effectively laterally outwardly in accordance with the orientation of the laminates. It is further to be appreciated that, should a component of the shock waves be conducted obliquely along such a laminate, when it reaches a dividing layer 16.3 having a low acoustic speed and thus offering high resistance to propagation of shock waves, the shock waves are deflected back into the high acoustic speed material which assists in guiding the shock waves laterally outwardly.

When the shock waves reach the surface of the guide member, and preferably it should do so at approximately right angles, the shock waves, when they encounter the neighbouring air, which has a low acoustic speed, cause spalling of the material which results in a fragment or fragments of material to be liberated and to be projected generally in the direction of spalling i.e. laterally outwardly.

In this regard, the Applicant has realized that a blast effect generated by the landmine explosion and following the shock waves in time, generally follows the path or route of least resistance. In this regard, the Applicant has further appreciated that the shock waves crack and pulverize the material of the guide member, but at a propagation speed substantially lower than the acoustic speed. Thus, the guide member remains intact fully to propagate the shock waves, but immediately behind the shock waves, cracks and pulverizes to facilitate being displaced or blown away by the blast effect. Thus, a route of lesser resistance is created in the direction in which the shock waves were guided. Furthermore, the effect of spalling and of a fragment being projected from the outer surface creates a region of low pressure which is followed by the blast effect.

Thus, the Applicant has realized that managing or guiding of the shock waves in a predetermined direction away from a body of the track vehicle not only protects the body against the effect of the shock waves, but also that the blast effect tends to follow the leader shock waves and that the body of the track vehicle is thus also protected against the effects of the blast.

Figure 4:
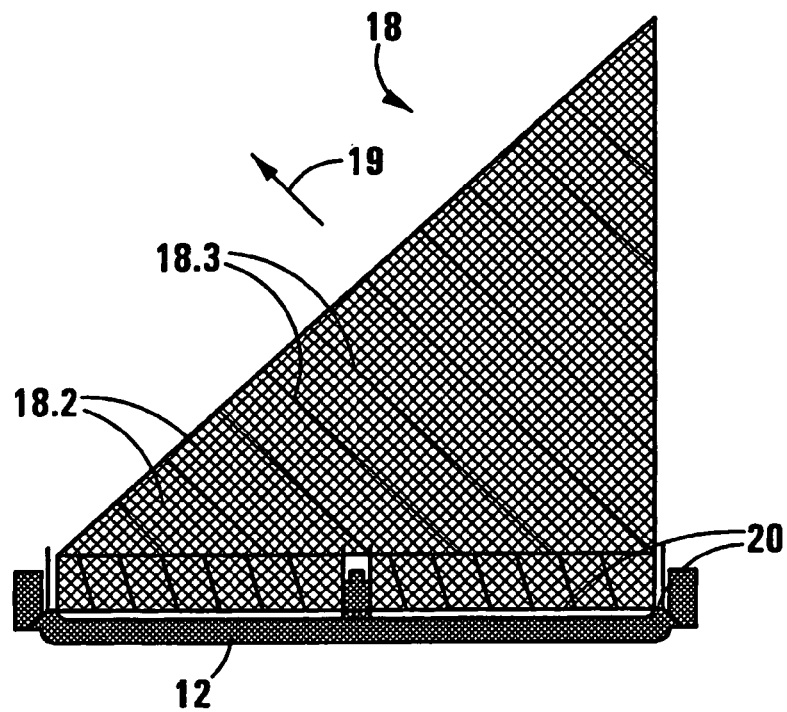
FIG. 4 shows, in cross section, to a larger scale, a guide member proximate a track of the track vehicle of FIG. 1.

Similarly, with reference to FIG. 4, a guide member 18 comprises a plurality of laminates 18.2 sandwiched by dividing layers 18.3 of polyurethane, rubber, or the like. By way of development, the guide member 18 is profiled at its interface with the track 12, to fit snugly over the track 12, and even to rub against the track 12. To mitigate such rubbing, a rubbing surface 20 of a low friction material such as Teflon is provided at the interface.

The mechanism of guiding of the shock waves in the case of the guide member 18 is exactly the same as that of the guide member 16 and also the creation of a route of lesser resistance is similar.

The Applicant believes that the invention provides a simple, elegant and relatively inexpensive method of managing shock waves by directing or guiding the shock waves in a desired direction, and furthermore that such guiding of the shock waves creates a route of lesser resistance which is followed by the blast in preference thus also protecting vulnerable and valuable parts of the vehicle against the effect not only of the shock waves, but also of the blast.

Figure 5:
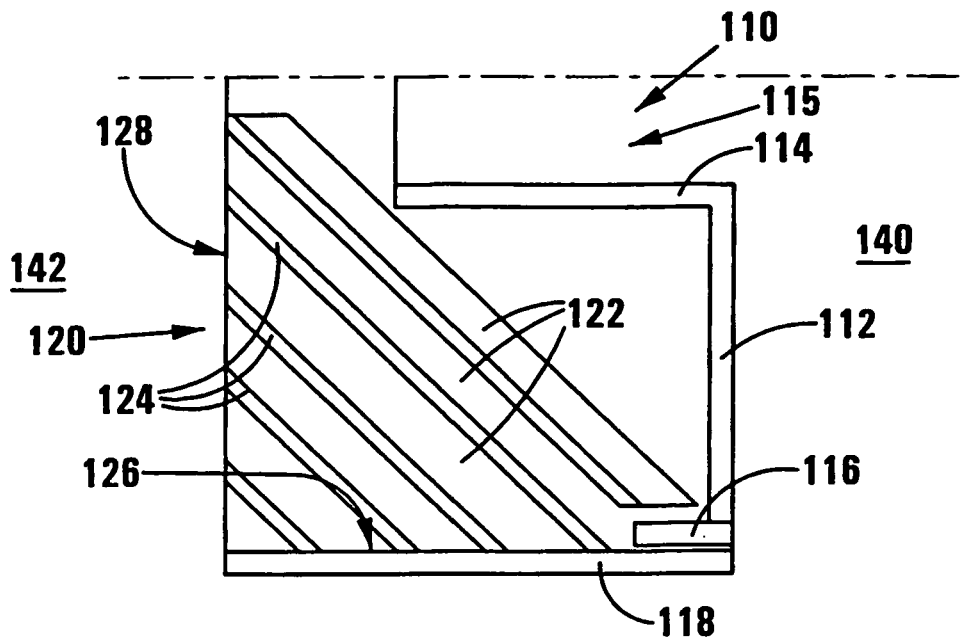
FIG. 5 shows, fragmentarily, in radial section, a first embodiment of a wheel for a wheeled vehicle in accordance with the invention.

With reference to FIG. 5 of the drawings, a wheel in accordance with the invention is generally indicated by reference numeral 110. The wheel 110 is a solid wheel, i.e. not a neumatic wheel or inflatable wheel. It is generally of sturdy construction and suitable for use in traversing a minefield to detonate anti-personnel mines. It is to be understood that it will be mounted to a vehicle. In accordance with the invention, the wheel 110 is suitable to protect a body or hull of the vehicle and thus also an occupant of the vehicle against the effect of a powerful landmine, such as an anti-tank mine, which may be encountered in a field of generally anti-personnel mines.

The wheel 110 comprises a wheel frame 112 having a hub 114 defining a hub volume 115 via which the wheel 110 is mounted to the vehicle in any appropriate fashion. The wheel frame 112 comprises, at an outer periphery thereof, a peripheral flange 116. A tread 118 in the form of a hoop of an appropriate grade of steel is mounted via the peripheral flange 16 to the wheel frame 112.

In accordance with the invention, in an annular space radially within the tread 118, there is provided a guide member 120 which is conveniently a composite member comprising a plurality of segments, together forming an annular construction.

Each section of the guide member 120 is of generally triangular cross-section comprising a plurality of laminates 122 with layers of dividing material in the form of dividers 124 being sandwiched in-between adjacent laminates 122. The laminates 122 and the dividers 124 form a parallel directed structure pointing radially inwardly and laterally outwardly. If a bottom segment of the wheel 110 is viewed, the laminates 122 and dividers 124 are directed obliquely upwardly and laterally outwardly. It is to be appreciated that the side of the wheel 110 having the wheel frame 112 will be proximate a body or hull of a vehicle to which the wheel 110 is mounted. That side, indicated by reference numeral 140, will be referred to as the protected side, as the body or hull, and the occupant of the vehicle are to be protected against the effects of a landmine explosion taking place underneath the tread 118.

The laminates 122 are of a material having a high acoustic speed, whereas the dividers 124 are of a yielding, even resilient, material having a low acoustic speed, such as a synthetic polymeric material, for example polyurethaine, rubber, or the like.

In the event of a landmine explosion underneath the tread 118, shock waves generated by the landmine explosion will propagate through the tread 118 and will be "loaded" into the guide member 120 via a surface 126 thereof proximate the tread 118. The applicant has realized that shock waves encounter resistance to propagation inversely proportional to the acoustic speed of a material. Thus in a material having a high acoustic speed like glass, or especially ceramic, such as that of the laminates 122, the shock waves are propagated well along such high acoustic speed material. It is further to be appreciated that the dividers 124 are of a material having a very low acoustic speed and thus offering very high resistance to propagation. In fact, a combination of a high acoustic speed material backed by a low acoustic speed material acts as a mirror for shock waves, thus deflecting or reflecting the shock wave back into the high acoustic speed material. In the embodiment illustrated, it is expected that shock waves traveling generally directly upwardly through the tread 118 into the respective laminates 122, will be guided obliquely laterally outwardly generally along the laminates 122 as deflection or reflection takes place at each interface between the respective laminates and their backing dividers 124. It is furthermore to be appreciated that the laminate 122 at the extremity is flanked by air, which also has a low acoustic velocity and deflecting will thus also take place along the extreme laminate 122.

Thus, it is expected that shock waves will be propagated obliquely upwardly and laterally outwardly from the surface 126 to a lateral surface 128 along an annular side of the guide member 120 and thus toward an outside, indicated by reference numeral 142 of the vehicle.

When the shock waves reach the surface 128 of the guide member 120, the shock waves, when they encounter the neighboring air, which has a low acoustic speed, cause spalling of the material which results in a fragment or fragments of material to be liberated and to be projected generally in the direction of spalling, i.e. generally laterally outwardly, to create a route of lesser resistance and thus to induce the blast effect generated by the landmine explosion and following the shock waves in time, generally to follow the path or route of lesser resistance, as described above.

Figure 6:
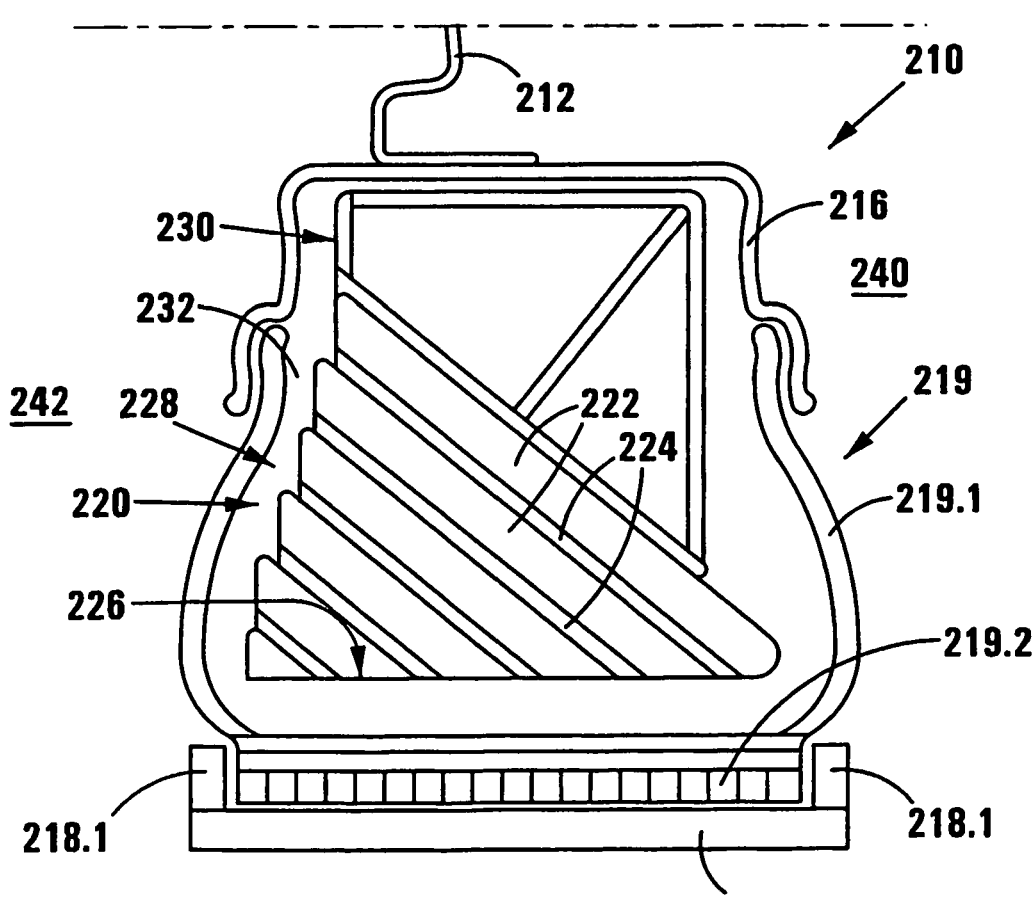
FIG. 6 shows, in a view corresponding to that of FIG. 5, a second embodiment of a wheel for a wheeled vehicle.

With reference to FIG. 6, a further, developed embodiment of a wheel in accordance with the invention is generally indicated by reference numeral 210. In many respects, the wheel 210 resembles the wheel 110 and its construction and operation are not fully described again.

The wheel 210 includes a wheel frame 212 having an outer peripheral rim 216 seating an inflatable tyre 219 having side walls 219.1 and a tread 219.2. A steel tread 218 in the form of a hoop and of an appropriately durable material such as steel which is resistant to explosions of anti-personnel mines, could be used. The steel tread 218 has, along side edges thereof, laterally inwardly directed flanges 218.1 for seating over the tyre tread 219.2 and thus to prevent the steel tread 218 from unseating. It is to be appreciated that the steel tread 218 will be positioned over the tyre 219 when the tyre is deflated.

Within the tyre 219, there is provided a guide member 220 similar to the guide member 120 of FIG. 5. The guide member 220 may be secured to the rim 216 in any convenient and appropriate fashion, for example by means of an annular, frame-like securing member 230 which is shown schematically. The guide member 220 has laminates 222 interposed by dividers 224 of materials similar to those described with reference to FIG. 5.

The mechanism of guiding of shock waves in the wheel 210 is similar to that described with reference to FIGS. 1 to 5 and it is thus not repeated.

By way of development, the volume within the tyre 219 is advantageously filled by means of a liquid 232. The liquid 232 is selected to be effective in absorbing energy associated with the landmine explosion. The liquid may have a relatively low boiling point and its latent heat of evaporation will be selected to absorb energy in the form of heat. A layer of liquid between the steel tread 218, and the face 226, will promote acoustic coupling and thus "loading" of the shock waves into the guide member 220.

It is to be appreciated that the wheel 210 of FIG. 6 has the advantage that it has some resilience providing a suspension effect and is thus expected to allow a vehicle to travel faster than a vehicle rolling along wheels of the kind of FIG. 5.

The invention has the advantage that a vehicle shod with wheels for traversing a minefield to detonate anti-personnel mines in the minefield, is protected against the effects of any high powered landmine, such as an anti-tank landmine, which may be laid in the minefield being cleared.

The invention is applicable in principle also in other kinds of wheels, for example, an annular guide member as described may be positioned within a well of a wheel frame having a "soft" tyre, i.e. a pneumatic tyre, a solid moulded tyre of rubber, polyurethane, or the like, whether or not such a wheel has an outer hoop of steel or other explosion resistant material;

within a pneumatic tyre (tubed or tubeless) when the wheel does not have the outer hoop as in FIG. 6;

moulded within a moulded solid tyre of rubber, polyurethane or the like, whether or not such a wheel has an outer hoop of steel or other explosion resistant material.

It should be apparent that the foregoing relates only to the preferred embodiments of the present application and that numerous changes and modifications may be made herein without departing from the general spirit and scope of the invention as defined by the following claims and the equivalents thereof.

The invention claimed is:

1. A method of protecting a body or hull and any occupant of a land vehicle movable along a substrate on ground engaging elements against the effects of a landmine explosion, including conducting shock waves generated by the landmine explosion laterally outwardly by means of a shock wave guide member comprising a plurality of oriented laminates of a material having a relatively high acoustic speed and located proximate a ground engaging element of the vehicle, the laminates being oriented to extend laterally outwardly.

2. A method as claimed in claim 1 in which the material of each shock wave guide member is selected from materials including glass or a suitable ceramic which have an acoustic speed of higher than about 6000 m/sec.

3. A method as claimed in claim 2, in which the ceramic is an alumina.

4. A method as claimed in claim 1 in which the vehicle is a track vehicle, the ground engaging elements being in the form of tracks, the guide members being located in at least one of a well of a bogey wheel and immediately above a bottom run of a track intermediate bogey wheels.

5. A method as claimed in claim 1 in which the vehicle is a wheeled vehicle, the ground engaging elements being in the form of wheels, the guide member being located in a well of the wheel.

6. A land vehicle movable along a substrate on ground engaging elements, which land vehicle is adapted or converted to protect its body or hull and any occupant against the effects of a landmine explosion, the land vehicle comprising a plurality of shock wave guide members proximate ground engaging elements of the land vehicle, characterized in that the shock wave guide members are of a material having a relatively high acoustic speed higher than the acoustic speed of metal used in components of the land vehicle which components have an acoustic speed generally of about 5000 m/sec, the shock wave guide members comprising a plurality of laminates oriented to conduct shock waves laterally outwardly away from the body or hull.

7. A land vehicle as claimed in claim 6, in which is in the material of each shock wave guide member is selected from materials, including glass or a suitable ceramic material which materials have an acoustic speed of higher than about 6000 m/sec.

8. A land vehicle as claimed in claim 7, in which the ceramic is an alumina.

9. A land vehicle as claimed in claim 6 which is in the form of a track vehicle, the ground engaging elements being in the form of tracks, in which the guide members are positioned in wells of bogey wheels, as well as immediately above a bottom run of each track intermediate bogey wheels.

10. A land vehicle as claimed in claim 9 in which the guide members proximate tracks intermediate bogey wheels have layers of low friction material on their surfaces interfacing with the tracks.

11. A land vehicle as claimed in claim 6 which is in the form of a wheeled vehicle, the ground engaging elements being in the form of wheels, in which the guide members are positioned annularly in wells of the wheels.

12. A land vehicle as claimed in claim 6 which is in the form of a wheeled vehicle, the ground engaging elements being in the form of wheels, each wheel having a hollow tire around a wheel rim, in which the guide members are positioned annularly in the hollows of the tires.

13. A land vehicle as claimed in claim 6 in which the guide members are of composite construction, each guide member comprising a plurality of oriented or directed laminates of a material having an acoustic speed of at least about 6000 m/sec.

14. A land vehicle as claimed in claim 13 in which the laminates are sandwiched in-between layers of material having a relatively low acoustic speed, lower than about 1000 m/sec.

15. A land vehicle as claimed in claim 13 in which the laminates are oriented to extend obliquely laterally outwardly in use.

16. A land vehicle as claimed in claim 13 in which said guide members have surfaces which are profiled snugly to be received with little clearance, or even slight touching, on surfaces of the ground engaging elements.

17. A ground engaging element for a land vehicle in combination with a shock wave guide member of a material having an acoustic speed of higher than about 6000 m/sec, the guide member being locatable proximate a ground engaging surface of the ground engaging element and comprising a plurality of laminates oriented to conduct shock waves laterally outwardly in use.

18. A combination as claimed in claim 17, in which the ground engaging element is a track and bogey wheel arrangement for a track vehicle, the guide member being adapted for location in one of a well of a bogey wheel, and immediately above a lower run of the track intermediate bogey wheels.

19. A combination as claimed in claim 17, in which the ground engaging element is a wheel for a wheeled vehicle, the guide member being adapted for location within a well of the wheel.

20. A combination as claimed in claim 17, in which the ground engaging element is a wheel, having a hollow tire, for a wheeled vehicle, the guide member being adapted for location within the hollow of the tire.

* * * * *